United States Patent Office 3,788,841
Patented Jan. 29, 1974

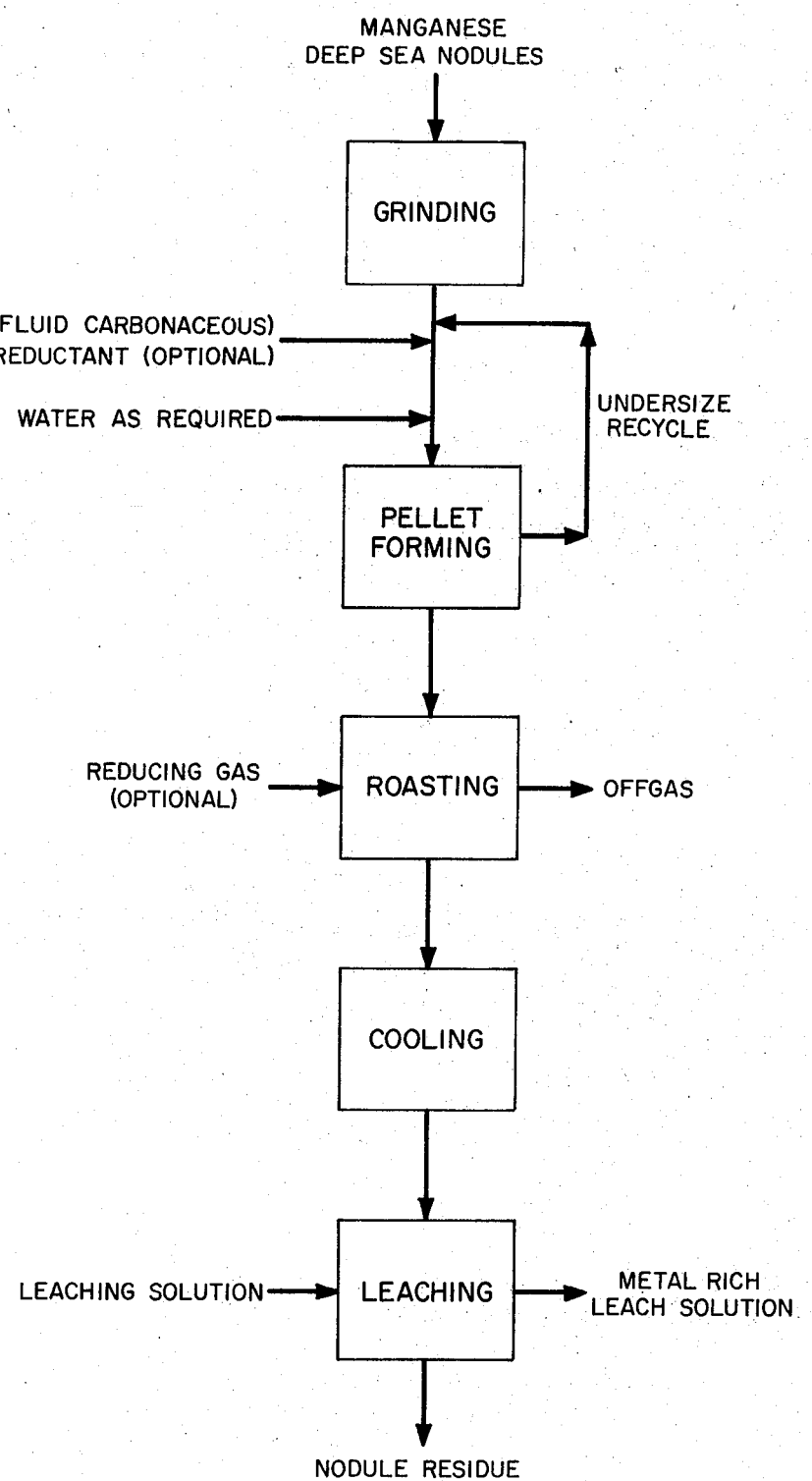

3,788,841
RECOVERY OF METAL VALUES FROM MANGANESE NODULES
Jagdish C. Agarwal, Concord, and Thomas C. Wilder, Cambridge, Mass., assignors to Kennecott Copper Corporation, New York, N.Y.
Filed Sept. 28, 1971, Ser. No. 184,397
Int. Cl. C22b 1/08, 3/00
U.S. Cl. 75—103                                15 Claims

ABSTRACT OF THE DISCLOSURE

This invention concerns a method for recovery of copper, nickel, cobalt and molybdenum from deep sea manganese nodules in which the nodules are ground, balled, roasted and leached.

CROSS REFERENCES

This invention is an improvement upon the co-pending patent applications of T. C. Wilder, Ser. No. 55,306, now U.S. Pat. No. 3,736,125; T. C. Wilder and J. J. Andreola, Ser. No. 55,608, now U.S. Pat. No. 3,753,686; R. R. Skarbo, Ser. No. 55,305, now U.S. Pat. No. 3,723,095, and M. J. Redman, Ser. No. 55,304, now U.S. Pat. No. 3,734,715, filed on July 16, 1970, which co-pending applications are hereby incorporated by reference.

BACKGROUND OF THE INVENTION

Certain deficiencies have been noted in developing the processes of the aforementioned co-pending patent applications for production scale operation. It is necessary to reduce the size of the nodules as recovered from the oceans so that a high extraction rate of copper, nickel, cobalt and molybdenum is obtained. The manganese nodules may be ground, for example, to a size from about ¼ inch in diameter to as small as minus 200 mesh, U.S. Standard Sieve Series. The mechanical handling, during the remaining steps of the recovery process, results in engineering difficulties at several stages of the process.

The nodules in a finely divided state can be reduced in a fluid bed reactor system using a reducing medium. Another means of reducing the nodules is to mix them with a reductant and heating in a rotary kiln. In both processes it is necessary to handle large quantities of finely divided material requiring expensive and difficult to maintain equipment.

After heating the reduced ground nodules are leached to remove the metals therefrom and the residue then separated from the metal rich leachate. Because of the finely divided state of the nodule residue, excessive capital and real estate requirements are committed to settling chambers, thickeners and filtration equipment.

It is, therefore, an object of this invention to provide a process for the recovery of copper, nickel, cobalt and molybdenum from manganese nodules that avoids the necessity of reducing and leaching finely divided nodule particles. A more specific object of the invention is to form manganese nodules into pellets having a strength sufficient to undergo the necessary mechanical handling and yet porous enough to be efficiently reduced and leached.

SUMMARY OF THE INVENTION

With these objects in view, the method of treating deep sea nodules to recover the copper, nickel, cobalt and manganese therefrom, according to the present invention, comprises the steps of crushing or grinding the deep sea nodules to reduce their size, agglomerating the ground nodules to form agglomerated, balled or pelletized nodules, without or with a reductant intimately mixed therewith, heating the pelletized nodules in such a manner to reduce at least the copper, nickel and cobalt therein to the metallic state, and leaching the reduced pelletized nodules with an aqueous solution of ammonia and an ammonium salt to obtain a metal rich leachate.

DESCRIPTION

The single figure is a schematic flowsheet of our process for selectively extracting copper, nickel, cobalt and molybdenum from manganese deep sea nodules.

The manganese nodules as received will vary in mean diameter from about 10 inches to about ½ inch. Therefore the first step in the processing is to reduce the size of the nodules. The nodules may be screened and the larger nodules broken up in a log washer or other means. Rod mills, ball mills, or other means, may also be used to wet grind the as received nodules.

The nodules as received are somewhat porous and when the sea water is drained contains about 40% by weight moisture. After reduction by grinding to about minus 10 mesh and filtered the nodules may contain only about 30% by weight moisture.

In some processing schemes it is desirable to dry the nodules at some step in the process. This may be prior to grinding, during grinding, or after agglomerating. The drying may be accomplished by any of the currently available equipment such as continuous through-circulation dryers or direct rotary dryers. It is possible to grind and dry simultaneously using a ring-roller or a pebble mill where the wet nodules are pulverized in contact with hot air or gas.

The manganese nodules may be ground to a size range where all ground nodules pass through a 6 mesh to where all ground nodules pass through a 200 mesh sieve, U.S. Sieve Series. We have found that overall economics prefer crushed nodules to be from no larger than about 40 mesh down to no more than about 120 mesh. Our development work has indicated that nodules ground to where all pass through 60 mesh (minus 60 mesh, 90% through 100 mesh) is the more desirable feed stock for the pelletizing or balling operation.

After crushing and/or grinding, the nodules are agglomerated to form green balls or pellets of a substantially uniform pre-selected size between about 3/32 inch and 1 inch, preferably about 3/8 inch in diameter. The terms balls and pellets will be used interchangeably throughout this specification. Balls or green balls are made by feeding ground nodules, additives and moisture independently to a rotating pan, disc or drum. Agglomerates are also made by mixing the ground nodules, additives, and moisture, and pressing the mixture into the form of pellets or briquettes.

Preferably the green balls are produced on a disc pelletizer. The disc pelletizer is advantageously mounted on a compound table which has three dimensional adjustment. A screw feeding mechanism is mounted to discharge onto the disc pelletizer between the 4 to 5 o'clock position on the disc. A water spray is adjustably mounted between the 9 to 11 o'clock position. The disc angle is preferably between about 40° to 60° with respect to the horizontal with an angle of 55° having been found the most effective for minus 60 mesh ground nodules.

When agglomerates or pellets are prepared on a disc the pellet size can be partially controlled by the amount of moisture added. Increasing the moisture content will increase the average size of the agglomerate or pellet. Decreasing the feed rate while holding other variables constant will also increase the pellet size. Hold-up time on the disc may be decreased by increasing the disc angle and speed resulting in smaller pellet sizes. Pellet size is best controlled by location of the water spray. Pellet size will decrease as water spray is changed from 9 to 11 o'clock. Moving the spray up on the rotating disc tends to form more seeds from the fine material carried up and thus increase number of pellets formed at the expense of increased pellet size. Seeds thus formed mature into seed pellets as they roll over the top and into the powder feed path.

Experience has shown that pellets or green balls of substantially spherically configurations are preferred. Spherical configurations are generally easier to make and have a greater strength than agglomerates of other shapes. The heating process, in which the green balls or pellets are subjected to a dehydration and reduction, renders the pellets porous since the water and other volatile materials depart from the pellet and increase the size of the internal contact surface.

To produce optimum pellet shape it is necessary to operate with an experimentally determined moisture content, which is suitable for the particular ocean floor nodules being used, since the physical characteristics of nodules mined from the ocean bed vary from place to place. For example, it may be necessary to add between from about 20% to about 40% by weight (based on weight of dry nodules) of water to the ground dry nodules. When the nodules are ground wet and agglomerated while still wet, it may be necessary to decrease the moisture content to obtain the desired agglomerate or pellet characteristics. Pellets containing from about 26 to 30% water have the most preferred physical characteristics for processing in this invention. Size of the pellets can be controlled during pelletizing by increasing or decreasing the moisture content, by adjusting the pan or disc inclination when a rotating pan or disc is used for agglomeration, and by increasing or decreasing the retention time on the pan or disc. In some cases it may be beneficial to include in the balling mixture a binder, for example, about 1% Wyoming Bentonite, which aids in the balling operation, increases the toughness of the green balls and promotes good surface properties.

Two physical characteristics of the prepared agglomerate or pellet discussed here are the crush strength and the drop resistance. The crush strength is the force in grams applied to the pellet to cause breakage divided by the cross sectional area in square inches of the pellet at the diameter. Drop resistance consists of dropping individual pellets from a height of eighteen inches onto a steel plate and the number of consecutive drops required for failure is used to determine an arithmetical average. Six to eight mesh green pellets average greater than 25 drops and dry pellets average about 15 drops ranging from 9 to about 25. Green pellets ¼ inch to 4 mesh average 12 ranging from about 10 to 20. Dry pellets of the same size average about 12 ranging from about 9 to 18 drops from the eighteen inch drop.

If the ground nodules are agglomerated or pelletized without a reductant the pellets are reduced, as described in the aforementioned copending patent application of M. J. Redman. Reducing gases are passed over or preferably through a moving or stationary bed of pellets.

The ground nodules are preferably intimately mixed with a reductant prior to or during the agglomeration or balling process. The reductant may be any high carbon content material such as coal, coke and petroleum products such as bunker C fuel oil. Preferably petroleum products are used as the reductant since there is evidence of an increase in pellet strength over pellets formed with finely ground coal or coke. The aforementioned co-pending patent application of T. C. Wilder and J. J. Andreola contains further details concerning the reduction of nodules intimately mixed with a reductant.

Pellets formed, as described above, using about 7% by weight bunker C oil (based on weight of dry nodules) as the reductant will have a density in the range of from about 1.20 to about 1.45 and assuming an absolute density in the solids of 2.9 will have a porosity of from about 44 to about 54%. Green crush strength of 6 to 8 mesh pellets will average about 72 grams ranging from about 48 to about 97 grams and the dry crush strength will average about 361 grams ranging from about 178 to about 425 grams. For pellets from ¼ inch to 4 mesh the green crush strength averages 124 grams ranging from 106 to 133 grams and the dry crush strength averages 941 grams ranging from 833 to about 1050 grams.

After the pelletizing or balling operation, continuous reduction may be accomplished by feeding the balls or pellets directly onto a gas permeable moving body, such as a traveling grate, in layers of a substantially uniform thickness in which the balls or pellets are at rest relative to each other on the moving body. This can be accomplished by known prior art means including means for distributing the balls onto a gas permeable traveling grate or traveling conveyor, such as a horizontal straight grate or conveyor. However, if desired, the reduction may be done in a batch operation in a furnace.

In an alternate processing scheme, the green balls may be pre-heated to dry them by subjecting them to a temperature between about 250° F. and about 350° F. for a period, usually between about 4 and about 10 minutes, long enough to dry the green balls and develop increased crush strength. If the green balls have been mixed with a solid or liquid reductant they may then be heated in an inert atmosphere.

If high strength balled or pelletized material is required for metallurgical processing, the ground nodules may be balled with an alkaline-earth metal oxide or hydroxide together with high volatile carbonaceous material such as coal, lignite, sawdust or molasses and treated with carbon dioxide gas to make carbonate bonded agglomerates. The finely ground nodules may also be carbonate bonded by using alkaline-earth metal carbonates, preferably calcium carbonate, along with the high volatile carbonaceous material. The preferred alkaline-earth metal compounds are the oxide and hydroxide of calcium. Normal ranges of alkaline earth oxide or hydroxide may vary from about 0.5% to about 8% of the dry nodules. The amount may be increased, if desired, or needed for increased structural strength in the pellets.

After the balls or pellets have been reduced by either gaseous reduction or by heating in an inert atmosphere when the pellets contain a reductant, the hot pellets are cooled down to about 200° C. in an inert atmosphere to prevent reoxidation.

The reduced pellets are then leached in the presence of an oxidizing agent with an aqueous solution of ammonia and an ammonium salt. The leach solution may contain, for example, from about 0.5 to about 4 molar ammonium carbonate and from about 5% to about 25% ammonia. After leaching the pellets exhibit an increased crush strength and drop resistance. Leaching may be accomplished either in a batch operation or a continuous countercurrent operation. Continuous countercurrent leaching using Rotocel type equipment is preferred.

The character and chemical content of the deep sea nodules may vary widely depending upon the region from which the nodules are obtained. For a detailed chemical analysis of nodules from the Pacific Ocean, see pages 449 and 450 in The Encyclopedia of Oceanography, edited by R. W. Fairbridge, Reinhold Publishing Corp, New York, 1966, and U.S. Pat. No. 3,169,856. The ocean floor or deep sea manganese nodules will be considered, for the purpose of the examples given below, as containing the following approximate metal content range on a dry basis.

METAL CONTENT RANGE

|  | Percent |
|---|---|
| Copper | 0.8–1.8 |
| Nickel | 1.0–2.0 |
| Cobalt | 0.1–0.5 |
| Molybdenum | 0.03–0.1 |
| Manganese | 10.0–40.0 |
| Iron | 4.0–25.0 |

The remainder of the ore consists of clay minerals with lesser amounts of quartz, apatite, biotite and sodium and potassium feldspars. Of the many ingredients making up the manganese nodules, copper and nickel are emphasized because, from an economic standpoint, they are the most significant metals in most of the ocean floor ores. Cobalt and molybdenum may also be recovered by the process of this invention.

The following specific examples are illustrative but not limitative of our invention. All variations which do not depart from the basic concept of the invention are intended to come within the scope of the appended claims.

In Examples 1 through 8 below, the roasted nodules have an average composition of about 1.45% copper, 1.70% nickel, 0.28% cobalt by weight. The term minus before nodule mesh size means that all ground nodules will pass through that mesh screen.

Example 1

Dried minus 60 mesh nodules were thoroughly mixed with 7% by weight of bituminous coal and 35% by weight water. The nodule-coal-water mixture was pelletized to about −8 +14 mesh sized pellets using a rotary disc pelletizer. Pellets were then heated to 800° C. under a nitrogen atmosphere. When the temperature reached 800° C. the furnace was shut off and the pellets allowed to cool to room temperature. The reduced nodule pellets were then leached for about 4 hours using air with a 1 molar ammonium carbonate 10% aqueous ammonia solution at room temperature. Extractions were 87.7% copper, 56.6% nickel, and 41.8% cobalt.

Example 2

Dried nodules to a minus 60 mesh were mixed with about 7% by weight of bituminous coal and 35% by weight water. The nodule-coal-water mixture was then pelletized in a rotary disc pelletizer into three size fractions. Each of the size fractions was then heated in a furnace under a nitrogen atmosphere to a temperature of 800° C. When the temperature was attained the furnace was turned off and the nodules allowed to cool to room temperature under the nitrogen atmosphere. Five gram portions of each of the three size fractions of cooled reduced nodules were leached for 4 hours with 100 ml. of 1 molar ammonium carbonate in 10% aqueous ammonia at room temperature. During the leaching the pellets were placed on a pedestal in the leach solution just above a magnetic stirrer in order not to break up the pellets during leaching. The stirrer was made to rotate vigorously such that the pellets were alternately covered and uncovered by the leach solution and thus were sufficiently exposed to air. Extractions for the three size fractions are given below:

| Size fraction | Percentage extraction of— | | |
| --- | --- | --- | --- |
| | Cu | Ni | Co |
| −⅛″+¼″ | 39.6 | 40.5 | 26.9 |
| −4 +6 mesh | 36.9 | 45.5 | 37.2 |
| −8 +10 | 61.3 | 69.8 | 58.8 |

Example 3

The reduced nodules in this example were prepared as described in Example 2 above. The leaching in this example was carried out in vertical glass towers. Air was sparged through the solutions through a fritted glass disc at the base of each of the towers just above the air inlet. The pellets did not break up during the leaching. The three size fractions 5-gram samples were leached with 100 ml. of 1 molar ammonium carbonate in 10% aqueous ammonia at room temperature for 3 hours. Percentage extractions are shown below:

| Size fraction | Percentage extraction of— | | |
| --- | --- | --- | --- |
| | Cu | Ni | Co |
| −½″ +⅜ | 28.3 | 23.1 | 19.7 |
| −¼″ +4 mesh | 48.5 | 37.1 | 33.3 |
| −6 +8 mesh | 49.4 | 53.2 | 47.8 |

Example 4

Dried manganese deep sea nodules were crushed to a minus 60 mesh and thoroughly mixed with about 7% by weight crude oil (petroleum) and about 35% water by weight, and pelletized on a rotary disc pelletizer to the small pellet size range of minus 4 mesh. The nodule pellets were then heated in a furnace to about 800° C. in a nitrogen atmosphere. The furnace was then turned off and the nodules allowed to cool to room temperature under the nitrogen atmosphere. Five grams each of the cooled reduced nodules in each of the indicated size fractions were leached for 4 hours with 100 ml. of 1 molar ammonium carbonate and 10% aqueous ammonia at room temperature. The results are tabulated below:

| Size of pellets | Percentage extraction of— | | |
| --- | --- | --- | --- |
| | Cu | Ni | Co |
| −4 +6 mesh | 41.1 | 48.5 | 37.5 |
| −6 +8 mesh | 44.0 | 52.2 | 30.1 |
| −60 mesh (ground) | 71.7 | 83.3 | 76.5 |

Example 5

Dried minus 60 mesh deep sea nodules were mixed with about 7% by weight bunker C fuel oil and about 35% water by weight, and pelletized in a rotary disc pelletizer to the range of pellet sizes indicated below. The nodule pellets were heated in a nitrogen atmosphere at 705° C. Five gram samples of each of the four size fractions were leached for 4 hours in vertical glass towers using a 100 ml. aliquot of 1 molar ammonium carbonate in 10% aqueous ammonia at room temperature for 4 hours. Extractions are tabulated below:

| Size of pellets | Percentage extraction of— | | |
| --- | --- | --- | --- |
| | Cu | Ni | Co |
| −3/8″ 4¼″ | 14.6 | 65.9 | 56.0 |
| −4 +8 mesh | 44.4 | 91.9 | 71.9 |
| −6 +8 mesh | 65.1 | 94.8 | 69.1 |
| −8 +10 mesh | 96.0 | 95.0 | 61.6 |
| −60 mesh powder | 98.0 | 95.8 | 71.4 |

Example 6

Manganese nodules were ground and dried to a minus 60 mesh and mixed with 7% by weight bunker C fuel oil and about 35% by weight water and pelletized in a rotary disc pelletizer. The nodule pellets were then heated under a nitrogen atmosphere at the temperatures indicated in the tabulation below. The furnace was shut off when the desired temperature was reached and allowed to cool maintaining the nitrogen atmosphere until room temperature was reached. Pellets in the size range from −6 +8 mesh were leached for 4 hours in vertical glass towers as described above. Percentage extractions are shown in the tabulation.

| Temperature of roast,° C. | Percentage extraction of— | | |
| --- | --- | --- | --- |
| | Cu | Ni | Co |
| 690 | 91.4 | 91.2 | 23.7 |
| 800 | 83.2 | 49.2 | 21.6 |
| 900 | 78.0 | 11.2 | 1.0 |

Example 7

Dried deep sea nodules were ground to a minus 60 mesh mixed with 7% by weight bunker C fuel oil and about 35 to 38% by weight of water. The mixture was pelletized and the pellets heated in a furnace at 700° C. for about ½ hour while maintaining a nitrogen atmosphere in the furnace. After the reduced pellets had cooled to room temperature a five gram sample of −8 +10 mesh pellets was leached at room temperature with 100 ml. of a 1 molar ammonium carbonate 10% aqueous ammonia solution. At various time intervals during the leaching aliquots were taken from the leach solution in order to measure the speed at which the copper, nickel and cobalt were being extracted from the pellets. The results are tabulated below:

| Time after start of leach | Percentage extraction of— | | |
|---|---|---|---|
| | Cu | Ni | Co |
| 5 minutes | 14.5 | 21.0 | 16.2 |
| 10 minutes | 15.0 | 30.0 | 23.1 |
| 15 minutes | 13.5 | 35.5 | 28.4 |
| 30 minutes | 14.2 | 53.0 | 44.1 |
| 1 hour | 23.0 | 78.5 | 64.2 |
| 2 hours | 58.0 | 95.0 | 71.1 |
| 4 hours | 91.5 | 95.5 | 69.0 |
| 6 hours | 96.0 | | 66.5 |
| 8 hours | 96.0 | | 64.0 |

Example 8

Deep sea manganese nodules were dried and ground to a minus 60 mesh. 7% by weight of bunker C fuel oil and 35 to 38% by weight of water were added to the ground pellets and the mixture pelletized. The pellets were heated for about ½ hour in a nitrogen atmosphere at 700° C. After cooling a 5-gram sample of −⅜″ +¼″ reduced pellets were leached at room temperature with 100 ml. of a 1 molar ammonium carbonate 10% aqueous ammonia solution. At various time intervals during the leaching aliquots of the leachate were withdrawn in order to check the progress of the extractions. Results are shown below:

| Nime after start of leach | Percentage extraction of— | | |
|---|---|---|---|
| | Cu | Ni | Co |
| 15 minutes | 2.3 | 13.5 | 16.0 |
| 30 minutes | 2.1 | 21.0 | 22.5 |
| 1 hour | 2.0 | 30.4 | 32.5 |
| 2 hours | 2.1 | 43.3 | 43.2 |
| 4 hours | 3.2 | 60.5 | 57.5 |
| 7 hours | 17.5 | 81.5 | 74.5 |
| 23 hours | 62.3 | 93.5 | 63.0 |
| 30 hours | 78.1 | 95.5 | 57.2 |

Example 9

Manganese nodules were ground to 100% minus 60 mesh. To the ground nodules were added (1) about 7% by weight of a high volatile coal ground to about minus 10 mesh and (2) about 2% by weight calcium hydroxide. The nodule-coal-calcuim hydroxide mixture was balled in an inclined rotating pan by adding sufficient water to form pellets approximately ⅜ inch in diameter. The pellets are preheated to from about 700–800° F. to drive off combined water and then heated to a temperature of about 1450° F. to reduce the manganese dioxide to a lower oxide state. After cooling the pellets in an inert atmosphere, the metal values are recovered by leaching.

Without further analysis, the foregoing will so fully reveal the gist of the present invention that others can, by applying current knowledge, readily adopt it for various applications without omitting features that fairly constitute essential characteristics of the generic or specific aspects of this invention and, therefore, such adaptations should and are intended to be comprehended within the meaning and range of equivalence of the following claims.

What we claim is:

1. A process for selectively extracting copper, nickel, cobalt and molybdenum from deep sea manganese nodules comprising the steps of
    (a) grinding the nodules to a size range from about minus 6 to about minus 200 mesh, U.S. Standard Sieve Series,
    (b) agglomerating the ground nodule into pellets,
    (c) reducing at least the copper, nickel and cobalt in the nodule pellets to the metallic state whereby porous reduced nodule pellets are produced,
    (d) leaching the porous reduced nodule pellets to selectively extract copper, nickel, cobalt and molybdenum therefrom with an ammonium salt aqueous ammonia solution and
    (e) separating a copper, nickel, cobalt and molybdenum rich leach solution substantially free from manganese and iron from pelletized nodule residue.

2. The process of claim 1 wherein the nodules are ground to 100% minus 60 mesh U.S. Standard Sieve Series.

3. The process of claim 2 wherein the ground nodules are agglomerated with from about 20 to about 38% by weight water to produce pellets having a size range from about 10 mesh to about ½ inch and reduced with a reducing gas.

4. The process of claim 3 wherein the reducing gas is selected from carbon monoxide-carbon dioxide mixtures, carbon monoxide-hydrogen mixtures and synthesis gas.

5. The process of claim 2 wherein the ground nodules are agglomerated with from about 20 to about 38% by weight water and a carbonaceous material having a carbon content of from about 3 to about 10% by weight of the ground nodules.

6. The process of claim 4 wherein the carbonaceous material is selected from anthracite coal, bituminous coal, methyl cellulose, crankcase oil, crude oil, bunker C fuel oil, lignite, sawdust, molasses and coke.

7. The process of claim 5 wherein the pellets are reduced at a temperature from about 700° C. to about 900° C.

8. A process for selectively extracting copper, nickel, cobalt and molybdenum from ocean floor nodules comprising the steps of
    (a) drying the nodules,
    (b) grinding the dried nodules to size range from about minus 6 to about minus 200, U.S. Standard Sieve Series,
    (c) agglomerating the ground nodules into pellets,
    (d) drying the pellets whereby dry porous pellets are produced,
    (e) reducing the dried porous pellets,
    (f) leaching the reduced porous pellets with an ammonium salt aqueous ammonia solution to extract the copper, nickel, cobalt and molybdenum, and
    (g) separating a copper, nickel, cobalt and molybdenum rich leach solution substantially free from manganese and iron from nodule pellet residue.

9. The process of claim 8 wherein the ground nodules are agglomerated with from about 20 to about 38% by weight water to produce pellets having a size range from about 10 mesh to about ½ inch and reduced with a reducing gas.

10. The process of claim 9 wherein the reducing gas is selected from carbon monoxide-carbon dioxide mixtures, carbon monoxide-hydrogen mixtures and synthesis gas.

11. The process of claim 8 wherein the ground nodules are agglomerated with from about 20 to about 38% by weight water and a carbonaceous material having a carbon content of from about 3 to about 10% by weight of the ground nodules.

12. The process of claim 11 wherein the carbonaceous material is selected from anthracite coal, bituminous coal, methyl cellulose, crankcase oil, crude oil, bunker C fuel oil, lignite, sawdust, molasses and coke.

13. The process of claim 11 wherein the pellets are reduced at a temperature from about 700° C. to about 900° C. in an inert atmosphere.

14. The process of claim 5 wherein the porous reduced nodule pellets have a porosity of at least about 40%.

15. The process of claim 11 wherein the dried porous pellets have a porosity of at least about 40%.

References Cited

UNITED STATES PATENTS

| | | | |
|---|---|---|---|
| 3,471,285 | 10/1969 | Rolf | 75—103 |
| 3,418,107 | 12/1968 | Carr | 75—1 |
| 3,409,427 | 11/1968 | Bonnivard | 75—1 |
| 3,644,114 | 2/1972 | Vosahlova | 75—103 |
| 2,647,828 | 8/1953 | McGauley | 75—103 |

L. DEWAYNE RUTLEDGE, Primary Examiner

P. D. ROSENBERG, Assistant Examiner

U.S. Cl. X.R.

75—3, 117, 119, 121